United States Patent
Ramsden et al.

(10) Patent No.: US 8,577,019 B2
(45) Date of Patent: Nov. 5, 2013

(54) METHODS, APPARATUS AND ARTICLES OF MANUFACTURE TO DETECT ECHO DURING TELECONFERENCES

(75) Inventors: David Ramsden, Wall, NJ (US); Douglas Jones, Basking Ridge, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1048 days.

(21) Appl. No.: 12/604,919

(22) Filed: Oct. 23, 2009

(65) Prior Publication Data

US 2011/0096916 A1 Apr. 28, 2011

(51) Int. Cl.
*H04M 9/08* (2006.01)
*H04M 1/00* (2006.01)

(52) U.S. Cl.
USPC ...................................... 379/406.08; 455/570

(58) Field of Classification Search
None
See application file for complete search history.

(56) References Cited

U.S. PATENT DOCUMENTS

| | | | |
|---|---|---|---|
| 6,687,372 B1 | 2/2004 | Trump et al. | |
| 8,184,537 B1 * | 5/2012 | Gopal et al. | 370/235 |
| 2002/0142811 A1 * | 10/2002 | Gupta et al. | 455/570 |
| 2004/0247112 A1 * | 12/2004 | Lee et al. | 379/414 |
| 2009/0103743 A1 * | 4/2009 | Honda | 381/66 |
| 2009/0129584 A1 * | 5/2009 | Aoyagi et al. | 379/406.06 |
| 2011/0069830 A1 * | 3/2011 | Chu et al. | 379/406.16 |

* cited by examiner

*Primary Examiner* — Simon Sing
*Assistant Examiner* — Jeffrey Lytle
(74) *Attorney, Agent, or Firm* — Hanley, Flight & Zimmerman, LLC

(57) ABSTRACT

Example methods, apparatus and articles of manufacture to detect echo during teleconferences are disclosed. A disclosed example method includes collecting first signal data for a first teleconference leg of a teleconference, collecting second signal data for a second teleconference leg of the teleconference, computing an echo detection metric from the first and second signal data, and comparing the echo detection metric to a threshold to determine whether an echo is likely present on the first teleconference leg of the teleconference.

17 Claims, 4 Drawing Sheets

METHODS, APPARATUS AND ARTICLES OF MANUFACTURE TO DETECT ECHO DURING TELECONFERENCES

FIELD OF THE DISCLOSURE

This disclosure relates generally to teleconferences and, more particularly, to methods, apparatus and articles of manufacture to detect echo during teleconferences.

BACKGROUND

An echo in a communication service is a potentially attenuated, potentially distorted and/or potentially altered version of what is transmitted by a device that is also received at the device. An echo may be caused by any number and/or type(s) of conditions such as, but not limited to, an impedance mismatch, an acoustic echo due to use of a speakerphone, etc. When an echo occurs with sufficient amplitude, and/or with sufficient delay and/or time offset relative to what was transmitted, the echo can be noticeable and/or annoying to a person utilizing the communication service and/or be disruptive to the ongoing communication service.

DETAILED DESCRIPTION

Example methods, apparatus and articles of manufacture to detect echo during teleconferences are disclosed. A disclosed example method includes collecting first signal data for a first teleconference leg of a teleconference, collecting second signal data for a second teleconference leg of the teleconference, computing an echo detection metric from the first and second signal data, and comparing the echo detection metric to a threshold to determine whether an echo is likely present on the first teleconference leg of the teleconference.

A disclosed example apparatus includes a teleconference bridge interface to collect first signal data for a first teleconference leg of a teleconference, and to collect second signal data for a second teleconference leg of the teleconference, a detector to compute an echo detection metric from the first and second signal data, and an echo identifier to compare the echo detection metric to a threshold to determine whether an echo is likely present on the first teleconference leg of the teleconference.

Figure 1:
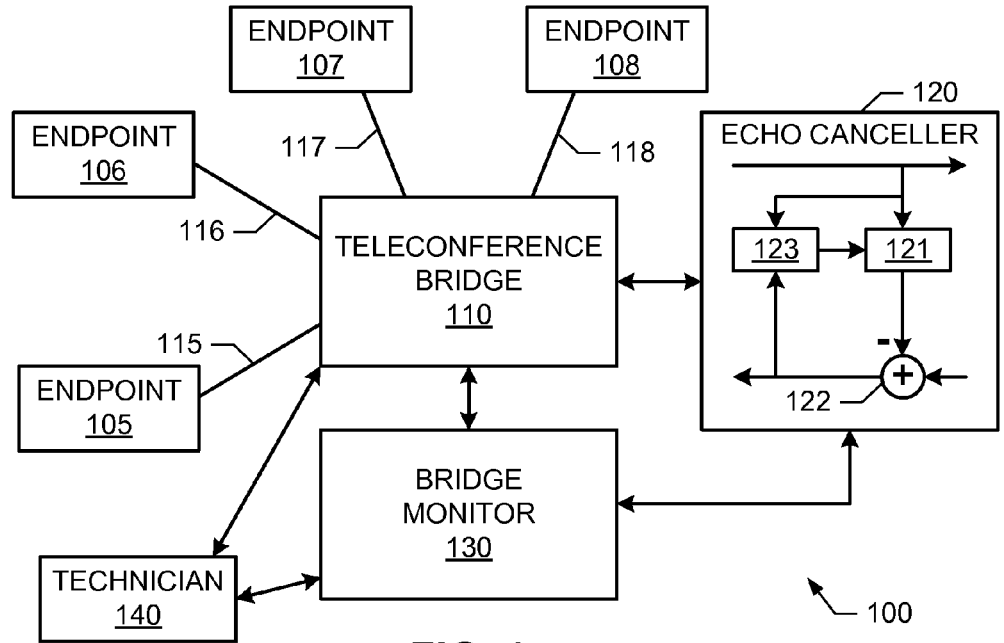
FIG. 1 is a schematic illustration of an example teleconferencing system constructed in accordance with the teachings of this disclosure.

FIG. 1 illustrates an example teleconferencing system 100. To enable audio and/or video teleconferences between any number and/or type(s) of endpoints (four of which are designated at reference numerals 105-108), the example teleconferencing system 100 of FIG. 1 includes a teleconference bridge 110. Example endpoints 105-108 include, but are not limited, a telephone, a speakerphone, a cellular telephone, a voice over Internet protocol (VoIP) telephone, and/or a personal computer. The example endpoints 105-108 of FIG. 1 are communicatively coupled to the example teleconference bridge 110 via respective communication paths 115-118. An endpoint 105-108 together with its respective communication path 115-118 are collectively referred to herein as a teleconference leg and/or a leg of a teleconference. The example communication paths 115-118 of FIG. 1 may each include any number and/or type(s) of wired and/or wireless communication path segments, circuits and/or communication media.

The example teleconference bridge 110 of FIG. 1 communicatively couples two or more of the example endpoints 105-108 together to implement and/or form a teleconference that allows, permits and/or enables users of those endpoints 105-108 to communicate simultaneously with each other via the teleconference bridge 110. Using any number and/or type (s) of circuit(s), device(s), and/or method(s), the example teleconference bridge 110 implements a particular teleconference by combining signal data received from each of the endpoints 105-108 participating in that teleconference and providing the combined signal data to each of those participating endpoints 105-108.

During a teleconference, echo present on one leg of the teleconference is often readily heard and/or perceived by users associated with other legs of the teleconference, and/or may interfere with what others hear and/or speak. Teleconference echoes may result in decreased customer satisfaction and/or lost revenue. As more telecommunication networks evolve to utilize VoIP technologies, increasing numbers of teleconference legs include communication paths having bulk and/or flat delays in excess of 128 milliseconds (ms), thereby increasing the likelihood of perceivable teleconference echoes.

To cancel echo(s) that are detected, identified and/or present on one or more legs of a teleconference, the example teleconferencing system 100 of FIG. 1 includes any number and/or type(s) of echo cancellers, one of which is designated at reference numeral 120. The example echo canceller 120 of FIG. 1 includes an adaptive filter 121 to convolve the transmitted signal associated with a teleconference leg with filter coefficients to form an estimate of the echo, and a subtractor 122 to subtract the estimate of the echo from the signal received via the teleconference leg. The example echo canceller 120 also includes an adapter 123 to adapt the filter coefficients to minimize the residual echo remaining in the received signal after the subtractor 122 subtracts the estimate of the echo. In some examples, the echo canceller 120 includes a non-linear processor (NLP) and/or echo suppressor (not shown) to eliminate any remaining residual echo. An example NLP attenuates the received signal with an attenuation factor adaptively and/or dynamically selected based on the signal strength of the remaining residual echo. For large remaining residual echoes, which may represent actual speech rather than echo, the attenuation factor is selected to be small. For small remaining residual echoes, the attenuation factor is selected to be larger, with the attenuation factor increasing as the signal strength of the remaining residual echo decreases. Example manners of implementing the example echo canceller 120 of FIG. 1 are described in U.S. patent application Ser. No. 12/562,366, entitled "Methods, Apparatus and Articles of Manufacture to Cancel Echo for Communication Paths Having Long Bulk Delays," and filed Sep. 18, 2009, which is hereby incorporated by reference in its entirety.

To monitor teleconferences for echo, the example teleconferencing system 100 of FIG. 1 includes a bridge monitor 130. The example bridge monitor 130 of FIG. 1 collects, receives and/or otherwise obtains from the example teleconference bridge 110 signal data for the legs of a currently considered teleconference, and processes the collected signal data to detect, identify and/or otherwise determine whether echo is present on any leg(s) of that teleconference. The example bridge monitor 130 computes one or more echo detection metrics from and/or based on the collected signal data. Example echo detection metrics that may be computed include, but are not limited to, a single-talk activity metric (STM), a double-talk activity metric (DTM), a muting metric (MM), a signal level during single-talk metric (SSM), a signal level during double-talk metric (DSM), and a signal correlation metric (SCM). The example STM represents a percentage of time that a presently considered teleconference leg is the only teleconference leg with an active signal. The example DTM represents a percentage of time that a presently considered teleconference leg and one or more other teleconference legs are simultaneously active. The example MM represents a percentage of time that a presently considered teleconference leg is muted at the teleconference bridge 110. The example SSM represents an average signal level in, for example, decibels (dB) referenced to one milliwatt (dBm), when a presently considered teleconference bridge has an active signal. The example DSM represents an average signal level in, for example, dBm, when a presently considered teleconference leg and one or more other teleconference legs are simultaneously active. The SCM represents a peak, largest and/or maximum correlation between the active signal on a presently considered teleconference leg and the active signal on another teleconference leg. In some examples, the SCM is zero when the two active signals are completely uncorrelated, and one when the two active signals are completely correlated. The computed SCM is associated with the teleconference leg having the weaker active signal, and is held and/or tracked over the duration of the teleconference. That is, the SCM represents the peak amount of correlation between two active teleconference legs during the teleconference.

The example bridge monitor 130 compares one or more of the echo detection metrics computed for a presently considered teleconference leg to respective thresholds to determine whether it is likely that echo is present on that teleconference leg. For example, it is likely that echo is present when the DTM is greater than a threshold when the teleconference is not muted, which can be expressed mathematically as $$(DTM-MM)/(100-MM) > T_{DAF}, \quad \text{EQN (1)}$$

where an example value of $T_{DAF}$ is 0.5 (i.e., 50%). It is also likely that echo is present when the STM is much smaller than the DTM when the leg is not muted, which can be expressed mathematically as $$(DTM-MM)/(100-MM) - (STM-MM)/(100-MM) > T_{AF}, \quad \text{EQN (2)}$$

where an example value of $T_{AF}$ is 0.5 (i.e., 50%). Echo is also likely present when SSM is significantly larger than the DSM, which can be expressed mathematically as $$SSM-DSM > T_{SL}, \quad \text{EQN (3)}$$

where an example value of $T_{SL}$ is 20 dB. When the SCM is large, which can be expressed mathematically as $$SCM > T_C, \quad \text{EQN (4)}$$

where an example value of $T_C$ is 0.5 (i.e., 50%), it is likely that echo is present. The example echo detection methods of EQNS 1-3 can be used to identify teleconference legs that are likely sources of echo. The example method of EQN 4 can detect echo with a higher level of certainty and/or reliability. In some examples, the bridge monitor 130 continually and/or proactively monitors the teleconference legs of each teleconference for echo so that any detected echo(s) can be cancelled prior to a teleconference participant complaint.

When one or more of the example comparisons of EQNS 1-4 indicate that it is likely that echo is present on a leg of a teleconference, the example bridge monitor 130 of FIG. 1 configures the echo canceller 120 to remove, reduce, mitigate, cancel and/or substantially eliminate the detected echo. The example bridge monitor 130 can query the echo canceller 120 to obtain one or more parameters representative of the current echo cancelling performance of the echo canceller 120. Example parameters include, but are not limited, an amount of echo removed, a filter coefficient value, a magnitude of a peak filter coefficient, etc. Such parameters may be used to, for example, verify the presence of the echo detected using the computed echo detection metrics described above. For example, if the filter coefficients have substantially random values it is unlikely that the echo is actually present. However, if the amount of echo removed is large then it is likely that the echo is present, etc.

To assist users during a teleconference and/or to troubleshoot problems, such as echo, a technician 140 may interact with the example teleconference bridge 110 and/or the example bridge monitor 130 of FIG. 1. When a teleconference participant mutes their teleconference leg 115-118 at their endpoint 105-108, which could prevent echo from being transmitted to the teleconference bridge 110, the example comparisons of EQNS 1-4 may not be able to identify that the muted teleconference leg 115-118 is a source of echo. When participants in a teleconference complain of an echo problem, the technician 140 can query the bridge monitor 130 to determine whether an echo was detected. If an echo was not detected, the technician 140 can instruct all teleconference participants to un-mute their user devices 105-108 and reset the echo detection metrics computed by the bridge monitor 130. The example bridge monitor 130 may then reattempt to detect and cancel the reported echo. Because the offending teleconference leg(s) is no longer muted, the example methods and apparatus described herein will be able to detect and cancel the teleconference echo.

While an example teleconferencing system 100 has been illustrated in FIG. 1, the elements illustrated in FIG. 1 may be combined, divided, re-arranged, eliminated and/or implemented in any way. For example, the teleconferencing system 100 may include more than one teleconference bridge 110 and/or more than one bridge monitor 130, and/or the bridge monitor 130 and/or the echo canceller 120 may be implemented by and/or within the teleconference bridge 110. Further, the example teleconference bridge 110, the example echo canceller 120, the example bridge monitor 130 and/or, more generally, the example teleconferencing system 100 of FIG. 1 may be implemented by hardware, software, firmware and/or any combination of hardware, software and/or firmware. Thus, for example, any of the example teleconference bridge 110, the example echo canceller 120, the example bridge monitor 130 and/or, more generally, the example teleconferencing system 100 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example teleconference bridge 110, the example echo canceller 120, the example bridge monitor 130 and/or the example teleconferencing system 100 are hereby expressly defined to include a tangible medium such as a memory, a digital versatile disc (DVD), a compact disc (CD), etc. storing the software and/or firmware. Further still, the example teleconferencing system 100 may include additional devices, servers, systems, networks and/or processors in addition to, or instead of, those illustrated in FIG. 1, and/or may include more than one of any or all of the illustrated devices, servers, networks, systems and/or processors. For example, the echo canceller 100 may include a non-linear processor.

Figure 2:
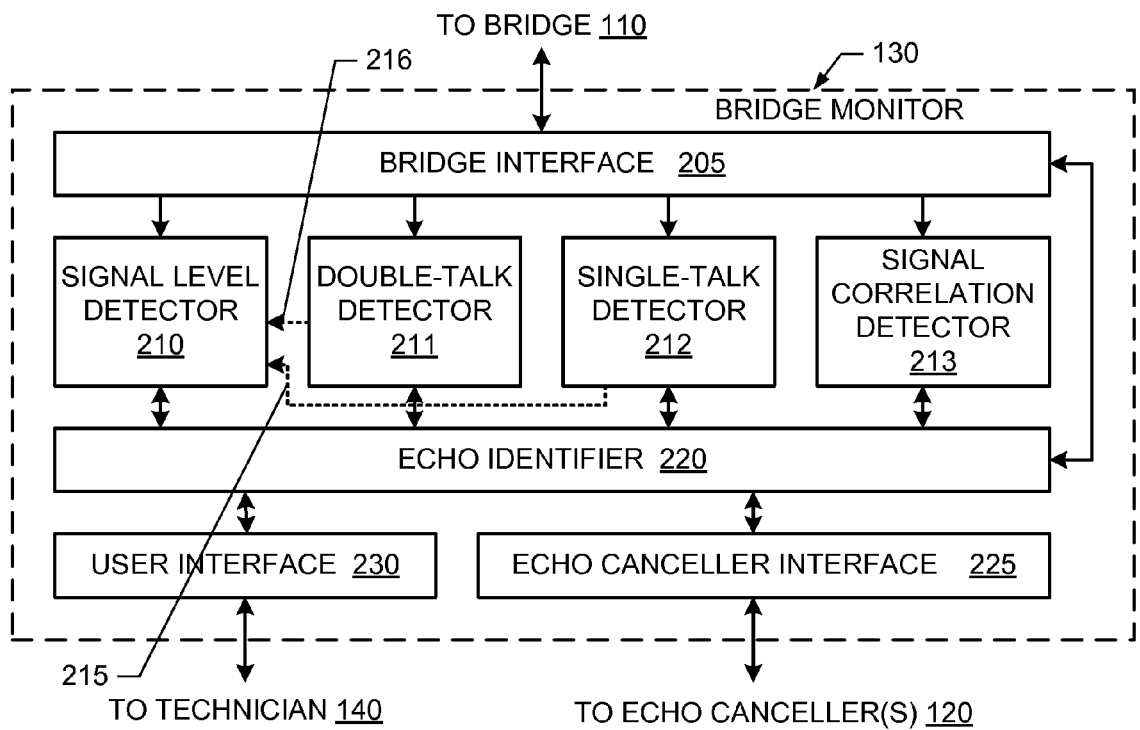
FIG. 2 illustrates an example manner of implementing the example bridge monitor of FIG. 1.

FIG. 2 illustrates an example manner of implementing the example bridge monitor 130 of FIG. 1. To collect, receive and/or otherwise obtain from the example teleconference bridge 110 signal data for the legs of a currently considered teleconference, the example bridge monitor 130 of FIG. 2 includes a bridge interface 205. Using any number and/or type(s) of method(s), protocol(s), application programming interface(s) (API(s)), and/or message(s), the example bridge interface 205 of FIG. 2 requests and obtains signal data from the teleconference bridge 110.

To compute echo detection metrics based on signal data obtain from the teleconference bridge 110 via the bridge interface 205, the example bridge monitor 130 of FIG. 2 includes any number and/or type(s) of detectors, four of which are designated at reference numerals 210-213. To measure signal levels, the example bridge monitor 130 of FIG. 2 includes the example signal level detector 210. Based on single-talk indications 215 and double-talk indications 216, the example signal level detector 210 of FIG. 2 measures and/or computes the SSM and DSM, described above in connection with FIG. 1.

To detect when two or more teleconference legs are simultaneously active (i.e., double-talk), the example bridge monitor 130 of FIG. 2 includes the example double-talk detector 211. Using any number and/or type(s) of method(s), algorithm(s), circuit(s) and/or device(s), the example double-talk detector 211 of FIG. 2 detects double-talk. The double-talk detector 211 provides the double-talk indications 216, which represent when double-talk is present, to the example signal level detector 210, which computes the DTM.

To detect when only a single teleconference leg is active, the example bridge monitor 130 of FIG. 2 includes the example single-talk detector 212. Using any number and/or type(s) of method(s), algorithm(s), circuit(s) and/or device (s), the example single-talk detector 212 of FIG. 2 detects single-talk. The single-talk detector 212 provides the single-talk indications 215, which represent when single-talk is present, to the example signal level detector 210, which computes the STM.

To correlate signals, the example bridge monitor 130 of FIG. 2 includes the example signal correlation detector 213. Using any number and/or type(s) of method(s), algorithm(s), circuit(s) and/or device(s), the example signal correlation detector 213 of FIG. 2 correlates the signal data associated with two teleconference legs and computes the SCM.

To determine whether echo is or is likely present, the example bridge monitor 130 of FIG. 2 includes an echo identifier 220. The example echo identifier 220 compares the one or more of the echo detection metrics computed by the example detectors 210-213 to respective thresholds to determine whether it is likely that echo is present on that teleconference leg. Example comparisons that may be used to determine whether echo is present are described above in connection with EQNS 1-4. The example echo identifier 220 obtains the example MM and/or data from which the MM can be computed either from the teleconference bridge 110 via the bridge interface 205 and/or via any of the example detectors 210-213.

When the example echo identifier 220 of FIG. 2 determines that echo is or is likely present on a leg of a teleconference, the example echo identifier 220, via an echo canceller interface 225, configures the echo canceller 120 to remove, reduce, cancel and/or substantially eliminate the detected echo. The example echo canceller interface 225 queries the echo canceller 120 via the echo canceller interface 225 to obtain one or more parameters representative of the current echo cancelling performance of the echo canceller 120. Example parameters include, but are not limited, an amount of echo removed, a filter coefficient value, a magnitude of a peak filter coefficient, etc. Such parameters may be used to, for example, verify the presence of the echo detected using the computed echo detection metrics described above. For example, if the filter coefficients have substantially random values it is unlikely that the echo is actually present. However, if the amount of echo removed is large, then it is likely that the echo is present, etc.

To allow the example technician 140 of FIG. 1 to interact with the bridge monitor 130, the example bridge monitor 130 includes any number and/or type(s) of user interfaces, one of which is designated at reference numeral 230. Example user interfaces 230 include, but are not limited to, an interactive voice response system, a web-based interface, and/or a custom-built graphical user interface. The technician 140 can, via the example user interface 230, query the echo identifier 220 to determine whether echo was detected for a teleconference and/or reset the echo detection metrics for a teleconference.

While an example manner of implementing the example bridge monitor 130 of FIG. 1 has been illustrated in FIG. 2, the interfaces, modules, elements and/or devices illustrated in FIG. 2 may be combined, divided, re-arranged, eliminated and/or implemented in any way. Further, the example interfaces 205, 225 and 230, the example detectors 210-213, the example echo identifier 220 and/or, more generally, the example bridge monitor 130 of FIG. 2 may be implemented by hardware, software, firmware and/or any combination of hardware, software and/or firmware. Thus, for example, any of the example interfaces 205, 225 and 230, the example detectors 210-213, the example echo identifier 220 and/or, more generally, the example bridge monitor 130 and/or, more generally, the example teleconferencing system 100 may be implemented by one or more circuit(s), programmable processor(s), ASIC(s), PLD(s) and/or FPLD(s), etc. When any of the appended apparatus claims are read to cover a purely software and/or firmware implementation, at least one of the example interfaces 205, 225 and 230, the example detectors 210-213, the example echo identifier 220 and/or, more generally, the example bridge monitor 130 are hereby expressly defined to include a tangible medium such as a memory, a DVD, a CD, etc. storing the software and/or firmware. Further still, the example bridge monitor 130 may include additional interfaces, modules, elements and/or devices in addition to, or instead of, those illustrated in FIG. 2, and/or may include more than one of any or all of the illustrated interfaces, modules, elements and/or devices.

Figure 3:
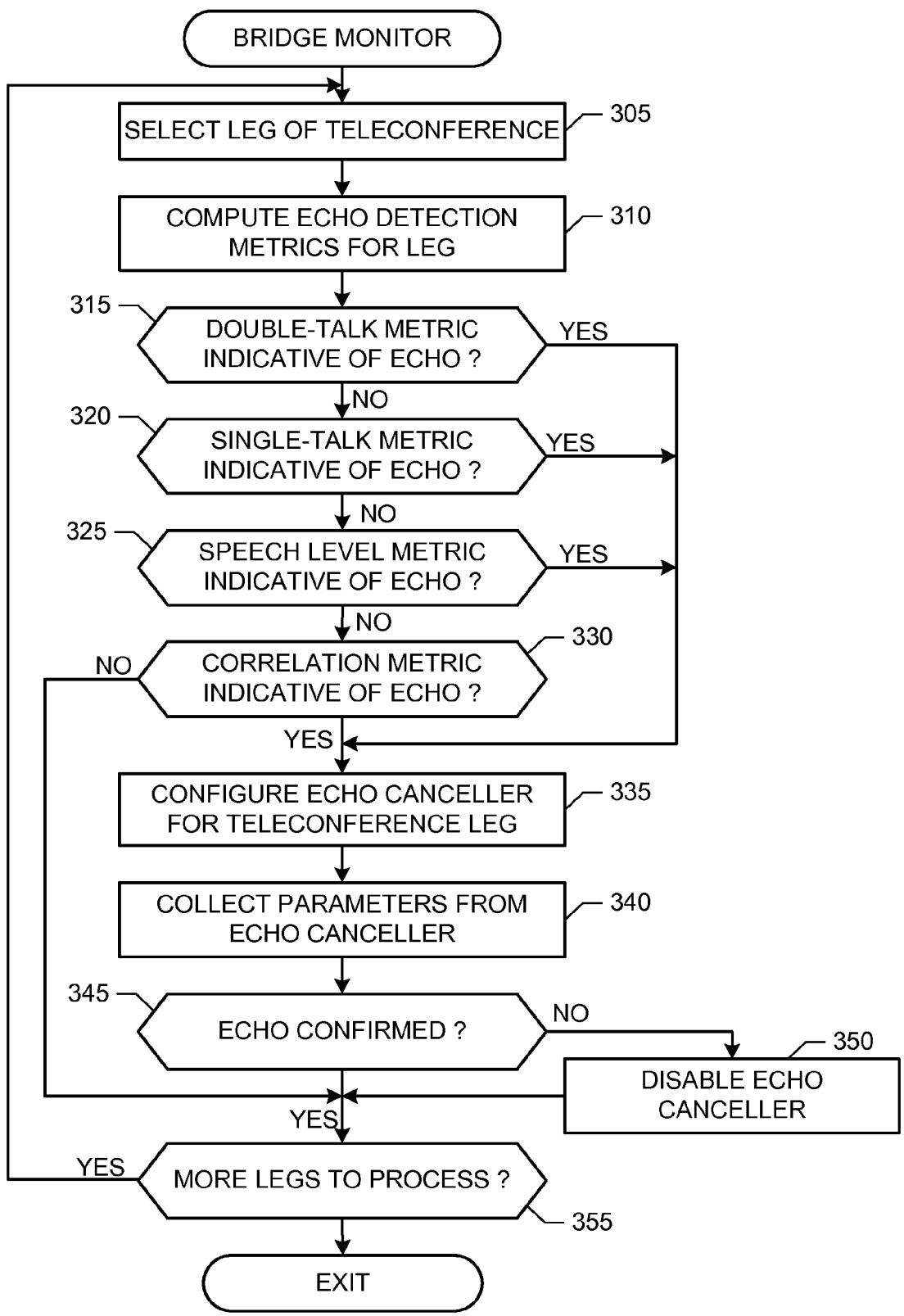
FIG. 3 is a flowchart representative of an example process that may be carried out to implement the example bridge monitor of FIGS. 1 and 2.
Figure 4:
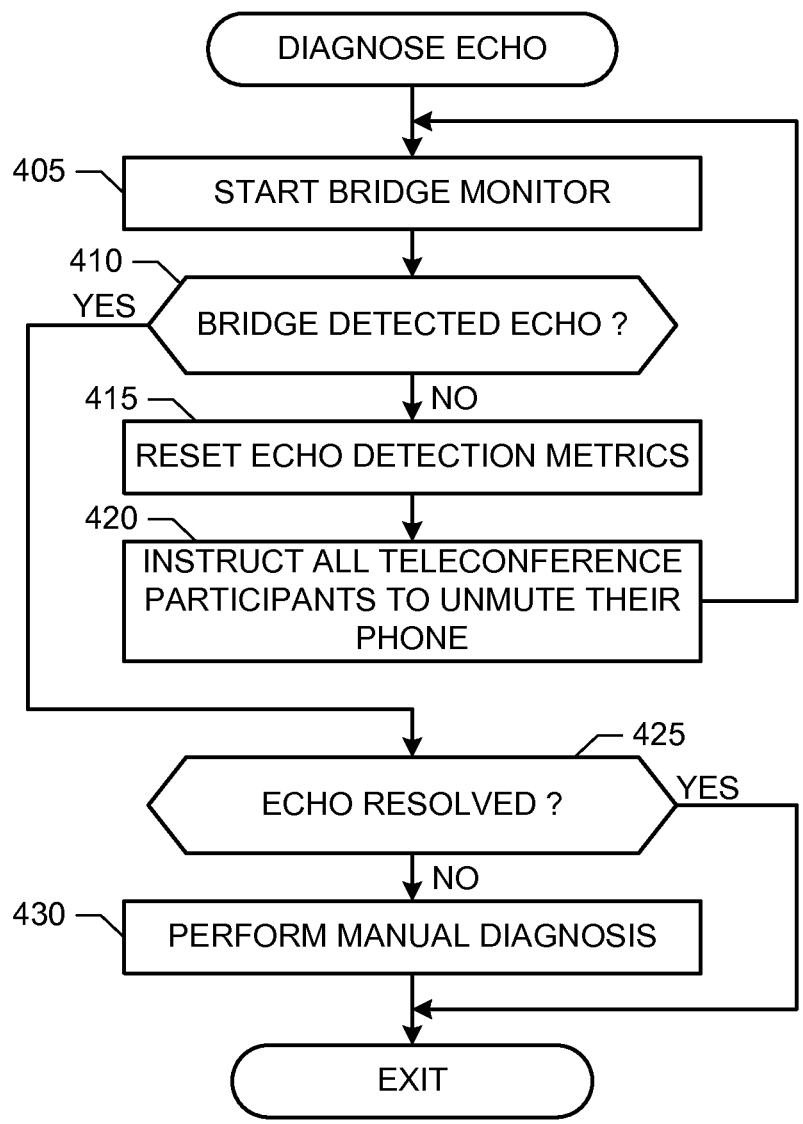
FIG. 4 is a flowchart representative of an example process that may be carried out to detect echo during a teleconference.

FIG. 3 is a flowchart representative of an example process that may be carried out to implement the example bridge monitor 130 of FIGS. 1 and 2. FIG. 4 is a flowchart representative of an example process that may be carried out to detect and remove echo during a teleconference. The example processes of FIGS. 3 and 4 may be carried out by a processor, a controller and/or any other suitable processing device. For example, the processes of FIGS. 3 and 4 may be embodied in coded instructions stored on any article of manufacture, such as any tangible computer-readable medium. Example tangible computer-readable medium include, but are not limited to, a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible instructions or data structures, and which can be electronically accessed by a processor, a general-purpose or special-purpose computer, or other machine with a processor (e.g., the example processor platform P100 discussed below in connection with FIG. 5). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular processes. Alternatively, some or all of the example processes of FIGS. 3 and 4 may be implemented using any combination(s) of ASIC(s), PLD(s), FPLD(s), discrete logic, hardware, firmware, etc. Also, some or all of the example processes of FIGS. 3 and 4 may instead be implemented manually or as any combination of any of the foregoing techniques, for example, any combination of firmware, software, discrete logic and/or hardware. Further, many other methods of implementing the example operations of FIGS. 3 and 4 may be employed. For example, the order of execution of the blocks may be changed, and/or one or more of the blocks described may be changed, eliminated, sub-divided, or combined. Additionally, any or all of the example processes of FIGS. 3 and 4 may be carried out sequentially and/or carried out in parallel by, for example, separate processing threads, processors, devices, discrete logic, circuits, etc.

The example process of FIG. 3 begins with the example echo identifier 220 selecting a leg of a teleconference (block 305). As described above in connection with FIGS. 1 and 2, the example detectors 210-213 compute the echo detection metrics STM, DTM, MM, SSM, DSM and SCM (block 310). If the expression of EQN (1) indicates that echo is or is likely present (block 315), control proceeds to block 335 to confirm the echo is present. If the expression of EQN (2) indicates that echo is or is likely present (block 320), control proceeds to block 335 to confirm the echo is present. If the expression of EQN (3) indicates that echo is or is likely present (block 325), control proceeds to block 335 to confirm the echo is present. If the expression of EQN (4) indicates that echo is or is likely present (block 330), control proceeds to block 335 to confirm the echo is present.

If any of the example expressions of EQNS 1-4 indicates that echo is or likely is present, the echo identifier 220 configures the echo canceller 120 via the echo canceller interface 225 to cancel the detected echo (block 335). After allowing the echo canceller 120 to converge, the echo identifier 220 obtains one or more parameters from the echo canceller 120 via the echo canceller interface 225 to confirm and/or determine whether echo was actually present (block 340). If presence of the suspected echo is not confirmed (block 345), the echo canceller 120 is disabled (block 350).

If there are more legs of the teleconference to process (block 355), control returns to block 305 to select the next teleconference leg. If there are no more teleconference legs to process (block 355), control exits from the example process of FIG. 3.

Returning to block 330, if none of the example comparisons of EQNS 1-4 indicates that echo is or is likely present (block 330), control proceeds to block 355 to determine whether there are more teleconference legs to process.

The example process of FIG. 4 begins with the example bridge monitor 130 being initialized and/or started (block 405). The example bridge monitor 130 may be automatically enabled for each teleconference and/or enabled by the technician 140 when echo is reported by a teleconference participant. If the bridge monitor 130 detected echo (block 410) and the echo was cancelled or resolved (block 425), control exits from the example process of FIG. 4.

If the bridge monitor 130 did not detect echo (block 410), the example technician 140 resets the echo detection metrics (block 415) and instructs all teleconference participants to un-mute their phones (block 420). Control returns to block 405 to restart and/or re-enable the bridge monitor 130 to detect and cancel echo.

If the bridge monitor 130 detected echo (block 410), but the detected echo was not cancelled or resolved (block 425), the technician 140 can perform manual diagnosis of the reported echo (block 430). Control then exits from the example process of FIG. 4.

Figure 5:
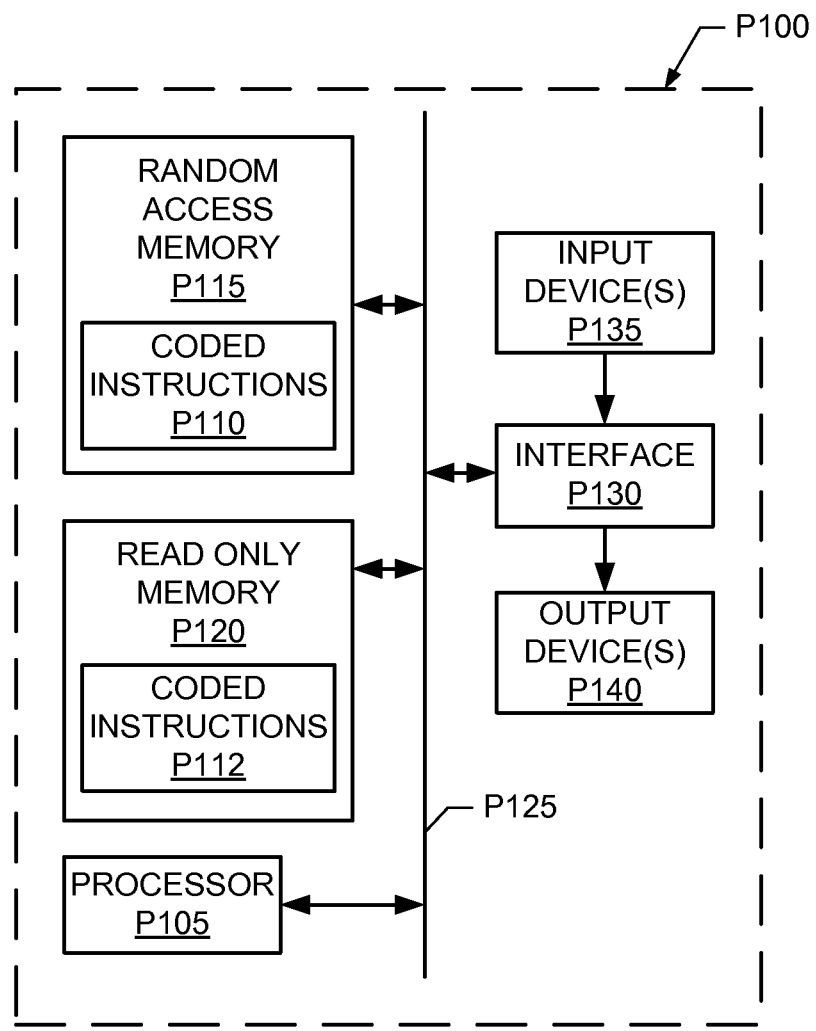
FIG. 5 is a schematic illustration of an example processor platform that may be used and/or programmed to carry out the example processes of FIGS. 3 and 4, and/or to implement any of all of the methods, apparatus and articles of manufacture disclosed herein.

FIG. 5 is a schematic diagram of an example processor platform P100 that may be used and/or programmed to implement the example bridge monitor 130 of FIGS. 1 and 2. For example, the processor platform P100 can be implemented by one or more general-purpose processors, processor cores, microcontrollers, etc.

The processor platform P100 of the example of FIG. 5 includes at least one general purpose programmable processor P105. The processor P105 executes coded and/or machine-accessible instructions P110 and/or P112 stored in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 3 and 4 to implement the example methods, apparatus and articles of manufacture described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P125. The interface circuit P125 may be implemented by any type of interface standard, such as an external memory interface, serial port, general-purpose input/output, etc. One or more input devices P130 and one or more output devices P130 are connected to the interface circuit P125. The input devices P130 and/or output devices P130 may be used to, for example, implement the example interfaces 205, 225 and 230 of FIG. 2.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   collecting first signal data for a first teleconference leg of a teleconference;

collecting second signal data for a second teleconference leg of the teleconference;

computing an echo detection metric from the first and second signal data, wherein the echo detection metric comprises a percentage of time the first teleconference leg is muted at a teleconference bridge;

comparing a value based on the echo detection metric to a threshold; and identifying the first teleconference leg of the teleconference as a likely source of an echo in response to the value being greater than the threshold.

2. A method as defined in claim 1, wherein the value is further based on a second echo detection metric comprising a single-talk activity factor representing a percentage of time that only the first signal data represents an active signal.

3. A method as defined in claim 1, wherein the value is further based on a second echo detection metric comprising a double-talk activity factor representing a percentage of time that both the first and second signal data represent active signals.

4. A method as defined in claim 1, further comprising computing a second echo detection metric comprising a signal level during single-talk representing a level of the first signal data when only the first signal data represents an active signal.

5. A method as defined in claim 1, further comprising computing a second echo detection metric comprising a signal level during double-talk representing a level of the first signal data when the second signal represents an active signal.

6. A method as defined in claim 1, further comprising computing a second echo detection metric comprising a correlation of the first and second signal data.

7. A method as defined in claim 1, further comprising adapting a filter to confirm the echo is present on the first teleconference leg when the comparison of the value and the threshold indicates the echo is likely present.

8. A method as defined in claim 7, further comprising analyzing a parameter indicative of performance of the filter to confirm the presence of the echo on the first teleconference leg.

9. An apparatus comprising:

a memory comprising machine readable instructions; and a processor to execute the machine readable instructions to perform operations comprising:

accessing first signal data for a first teleconference leg of a teleconference accessing second signal data for a second teleconference leg of the teleconference;

computing an echo detection metric from the first and second signal data, the echo detection metric representing a percentage of time the first teleconference leg is muted at a teleconference bridge;

comparing a value based on the echo detection metric to a threshold; and identifying the first teleconference leg of the teleconference as a likely source of an echo based on the comparison of the value to the threshold.

10. An apparatus as defined in claim 9, wherein the value is further based on a single-talk activity factor representing a percentage of time that only the first signal data represents an active signal.

11. An apparatus as defined in claim 9, wherein the value is further based on a double-talk activity factor representing a percentage of time that both the first and second signal data represent active signals.

12. An apparatus as defined in claim 9, wherein the operations further comprise identifying a level of the first signal data when only the first signal data represents an active signal.

13. An apparatus as defined in claim 9, wherein the operations further comprise identifying a level of the first signal data when the second signal represents an active signal.

14. An apparatus as defined in claim 9, wherein the operations further comprise correlating the first and second signal data.

15. An apparatus as defined in claim 9, wherein the operations further comprise adapting filter coefficients based on the first and second signal data, and confirming the echo is present on the first teleconference leg based on the adapted filter coefficients.

16. A tangible machine-readable storage device comprising instructions that, when executed, cause a machine to perform operations comprising:

accessing first signal data for a first teleconference leg of a teleconference;

accessing second signal data for a second teleconference leg of the teleconference;

calculating an echo detection metric from at least one of the first and second signal data, wherein the echo detection metric comprises a percentage of time the first teleconference leg is muted at a teleconference bridge;

comparing the echo detection metric to a threshold; and identifying the first teleconference leg of the teleconference as likely including an echo in response to the echo detection metric being greater than the threshold.

17. A storage device as defined in claim 16, wherein the operations further comprise adapting a filter to confirm the echo is present on the first teleconference leg when the comparison of the echo detection metric and the threshold indicates the echo is likely present.

* * * * *